(12) United States Patent
Ito (10) Patent No.: US 8,899,683 B2
(45) Date of Patent: Dec. 2, 2014

(54) SEAT ADJUSTMENT DEVICE, AND VEHICLE SEAT DEVICE WITH THE SEAT ADJUSTMENT DEVICE

(75) Inventor: Sadao Ito, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/979,924

(22) PCT Filed: Jan. 18, 2012

(86) PCT No.: PCT/JP2012/050906
§ 371 (c)(1),
(2), (4) Date: Jul. 16, 2013

(87) PCT Pub. No.: WO2012/105316
PCT Pub. Date: Aug. 9, 2012

(65) Prior Publication Data
US 2013/0300174 A1 Nov. 14, 2013

(30) Foreign Application Priority Data

Feb. 2, 2011 (JP) .................................. 2011-020963

(51) Int. Cl.
| | |
|---|---|
| *B60N 2/22* | (2006.01) |
| *A47C 7/46* | (2006.01) |
| *B60N 2/02* | (2006.01) |
| *B60N 2/225* | (2006.01) |
| *B60N 2/68* | (2006.01) |
| *B60N 2/16* | (2006.01) |

(52) U.S. Cl.
CPC ............ *B60N 2/2222* (2013.01); *B60N 2/0232* (2013.01); *B60N 2/2252* (2013.01); *B60N 2/688* (2013.01); *B60N 2/1615* (2013.01); *B60N 2002/024* (2013.01); *B60N 2/2254* (2013.01)
USPC ..................................... 297/354.11; 297/408

(58) Field of Classification Search
CPC ................................ B60N 2/22; B60N 2/2222
USPC ............................................. 297/354.11, 408
See application file for complete search history.

(56) References Cited

U.S. PATENT DOCUMENTS

| | | | |
|---|---|---|---|
| 4,626,028 A | * | 12/1986 | Hatsutta et al. ................ 297/408 |
| 7,052,089 B2 | * | 5/2006 | May .............................. 297/408 |

(Continued)

FOREIGN PATENT DOCUMENTS

| | | | |
|---|---|---|---|
| DE | 19726800 C2 | * 12/2002 | ........... B60N 2/2222 |
| DE | 10 2005 022 645 B3 | 9/2006 | |

(Continued)

OTHER PUBLICATIONS

International Search Report Issued Feb. 21, 2012 in PCT/JP12/050906 Filed Jan. 18, 2012.

(Continued)

*Primary Examiner* — Anthony D Barfield
(74) *Attorney, Agent, or Firm* — Oblon, Spivak, McClelland, Maier & Neustadt, L.L.P.

(57) ABSTRACT

A seat adjustment device adjusts the pivoting angle formed by a first seat member and a second seat member. A hinge shaft connects at a first connection point, the first seat member, and the second seat member. An arm section and a connection mechanism are connected at a second connection point. The positions of the axes of the first connection point, the second connection point, and a pivoting section are set in such a manner that, when a load is applied to the front end of either the first seat member or the second seat member, the distance from the second connection point to the axis of the pivoting section is less than the distance from the first connection point to the second connection point with respect to the direction perpendicular to the line of action of a load applied to the second connection point.

7 Claims, 7 Drawing Sheets

(56) References Cited

U.S. PATENT DOCUMENTS

| | | |
|---|---|---|
| 7,845,729 B2 | 12/2010 | Yamada et al. |
| 2010/0244525 A1 | 9/2010 | Ito et al. |

FOREIGN PATENT DOCUMENTS

| | | |
|---|---|---|
| JP | 63 42855 | 11/1988 |
| JP | 2579110 | 8/1998 |
| JP | 2009 11603 | 1/2009 |
| JP | 2010042748 A * | 2/2010 ............... B60N 2/22 |
| JP | 2010 228602 | 10/2010 |
| JP | 2010 228603 | 10/2010 |
| WO | WO 2008/134899 A1 | 11/2008 |

OTHER PUBLICATIONS

The Extended European Search Report issued Jan. 3, 2014, in Application No. / Patent No. 12741549.5-1758 / 2671752 PCT/JP2012050906.

* cited by examiner

SEAT ADJUSTMENT DEVICE, AND VEHICLE SEAT DEVICE WITH THE SEAT ADJUSTMENT DEVICE

TECHNICAL FIELD

The present invention relates to a seat adjustment device that adjusts a pivot angle between a first seat member and a second seat member, which are pivotally coupled to each other, and a vehicle seat apparatus that includes a seat back divided into an upper portion and a lower portion in a vertical direction and allows for the upper portion to be tilted relative to the lower portion by the seat adjustment device in a front to rear direction.

BACKGROUND ART

Various types of vehicle seat apparatuses have been proposed in the prior art (e.g., patent documents 1 and 2). A seat back of these seat apparatuses is divided into a lower portion, capable of supporting the waist of a vehicle occupant sitting on the seat apparatus, and an upper portion, capable of supporting a blade bone of the vehicle occupant. A seat adjustment device couples an upper frame (first seat member) forming the framework for the upper portion of the seat back and a lower frame (second seat member) forming the framework for the lower portion of the seat back so that the upper frame is tiltable relative to the lower frame in the front to rear direction.

In particular, patent document 1 proposes a seat adjustment device (middle folding mechanism) of which the main component is a link mechanism used so that appearance pivot centers of the lower frame and the upper frame are located in front of a seat back skin that covers a front surface of the seat back frame. As a result, the motion of the seat back when the upper portion is tilted becomes close to the motion of a vehicle occupant when the vehicle occupant bends forward. This suppresses pushing of the back of the vehicle occupant with the upper portion of the seat back, and reduces a sense of being confined or being in a narrow place.

In patent document 2, the upper frame (first seat member) and the lower frame (second seat member) are pivotally coupled to each other by a hinge shaft arranged near a vehicle occupant. A middle folding mechanism couples the upper frame and the lower frame. The middle folding mechanism includes a first link having one end pivotally coupled to the upper frame, a second link having one end pivotally coupled to the lower frame and a further end pivotally coupled to the first link, a drive device, and a telescopic mechanism that may be expanded and contracted back and forth by the drive device. The first link has another end pivotally coupled to the telescopic mechanism, and the further end of the second link is pivotally coupled to the drive device. The telescopic mechanism includes a screw-nut mechanism, for example. In this case, the layout of a coupling point of the first link and the second link, a coupling point of the upper frame and the first link, a coupling point of the lower frame and the second link, a coupling point of the first link and the telescopic mechanism, and a coupling point of the lower frame and the drive device is set so that when a load is input to an upper end of the upper frame, the load applied to the coupling point of the first link and the telescopic mechanism is smaller than the load applied to the coupling point of the upper frame and the first link. As a result, the telescopic mechanism has a structure that is simple and withstands small loads.

PRIOR ART DOCUMENTS

Patent Documents

Patent Document 1: Japanese Laid-Open Patent Publication No. 2009-11603
Patent Document 2: Japanese Laid-Open Patent Publication No. 2010-228602

SUMMARY OF THE INVENTION

In patent document 1, the seat adjustment device is formed by the link mechanism. Thus, sufficient strength has to be ensured at all links and pivot shafts of the links. This increases the thickness of plates and results in enlargement of the entire apparatus.

In patent document 2, the coupling points are set to reduce the load applied to the coupling point of the first link and the telescopic mechanism and to the telescopic mechanism. However, during, for example, a vehicle collision, when the vehicle seat apparatus is a seat belt-integrated seat incorporating a winding device for a seat belt and including a shoulder anchor arranged on an upper end of the seat back, an extreme load is applied, as tension of the seat belt, to the upper end of the seat back (upper frame) that is separated from a pivot shaft of the telescopic mechanism. In this case, an extreme moment, which is correlated with a multiplier of the distance to the pivot shaft and a tension of the seat belt, is applied to the pivot shaft of the telescopic mechanism, and sufficient strength (moment strength) has to be ensured for the telescopic mechanism. This enlarged the screw and nut of the telescopic mechanism, which, in turn, enlarged the entire apparatus.

It is an object of the present invention to provide a seat adjustment device capable of reducing moment strength required for a rotation adjustment mechanism for adjusting a pivot angle of a first seat member and a second seat member that are pivotally coupled to each other, and to provide a vehicle seat apparatus including such a seat adjustment device.

To achieve the above object, one aspect of the present invention provides a seat adjustment device for adjusting a pivot angle between a first seat member and a second seat member coupled by a hinge shaft in a relatively pivotal manner. The seat adjustment device includes a rotation adjustment mechanism, an arm portion, and a coupling mechanism. The rotation adjustment mechanism includes a fixed portion, which is fixed to the first seat member, and a pivot portion, which has an axis parallel to an axis of the hinge shaft and which is pivotally coupled to the fixed portion. The rotation adjustment mechanism adjusts a rotation angle between the fixed portion and the pivot portion. The arm portion is arranged on the pivot portion. The arm portion outwardly extends in a radial direction from the axis of the pivot portion. The coupling mechanism is arranged between the second seat member and the arm portion. The coupling mechanism moves in cooperation with rotation of the pivot portion relative to the fixed portion and relatively pivots the first seat member and the second seat member to absorb a change in an eccentric amount of the axis of the pivot portion relative to the axis of the hinge shaft. The hinge shaft couples the first seat member and the second seat member at a first coupling point, and the arm portion and the coupling mechanism are coupled to each other at a second coupling point. When a load is applied to a distal end of one of the first seat member and the second seat member, moment acts on the first coupling point, and a load is applied to the second coupling point from the other one of the first seat member and the second seat member based on the moment. A position of an axis of each of the first coupling point, the second coupling point, and the pivot portion is set so that a distance from the second coupling point to the axis of the pivot portion is shorter than a distance from the first coupling point to the second coupling point in a direction perpendicular to an acting line of the load applied to the second coupling point.

DETAILED DESCRIPTION OF THE PREFERRED EMBODIMENTS

First Embodiment

Figure 1:
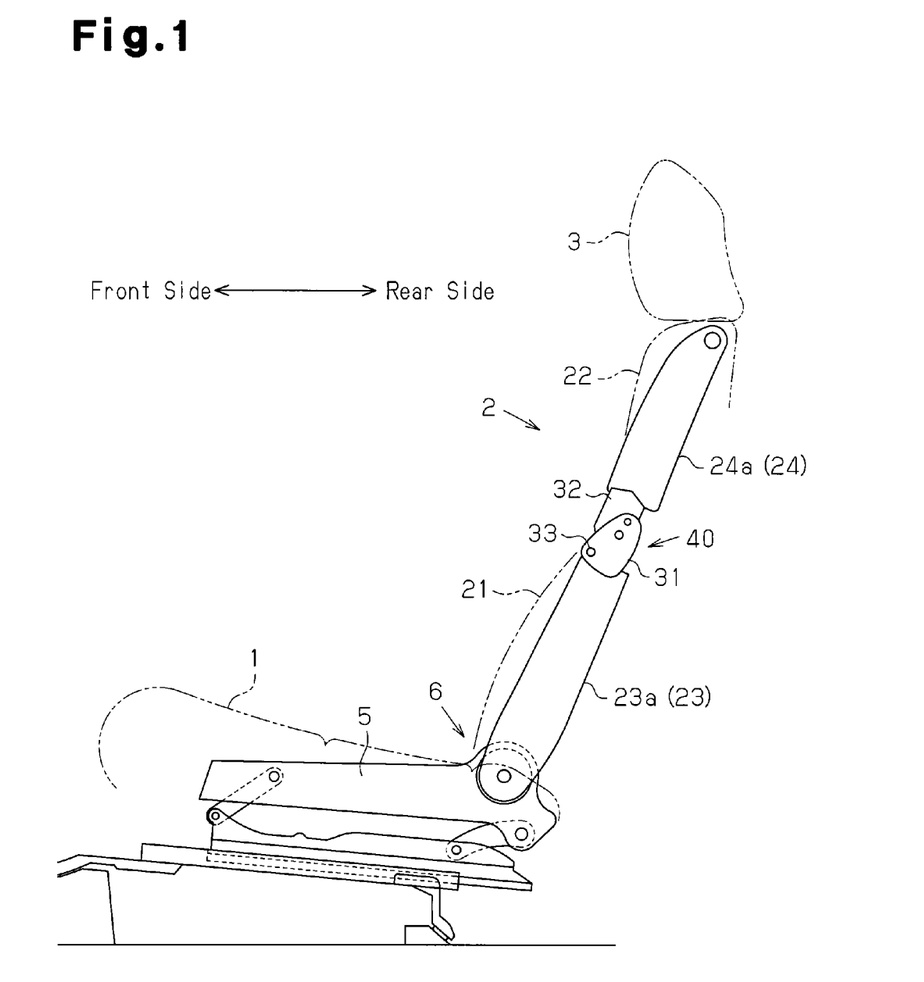
FIG. 1 is a schematic side view showing a vehicle seat apparatus according to a first embodiment of the present invention.

A first embodiment of the present invention will be described with reference to FIG. 1. As shown in FIG. 1, a vehicle seat apparatus, which is mounted as a front seat in a vehicle such as an automobile, for example, includes a seat cushion 1, which forms a seating portion, having a rear end that supports a lower end of a seat back 2, which forming a backrest, so that the seat back 2 is tiltable in a front to rear direction. The seat back 2 is divided into a lower seat back 21, which is capable of supporting the waist of a vehicle occupant, and an upper seat back 22, which is capable of supporting a blade bone of the vehicle occupant. The seat back 2 is supported by the rear end of the seat cushion 1 at a lower end of the lower seat back 21 so that the seat back 2 is tiltable in the front to rear direction. A headrest 3 for supporting the head of a vehicle occupant is arranged on an upper end of the seat back 2 (upper seat back 22) so that the headrest 3 is movable upward and downward.

Figure 2:
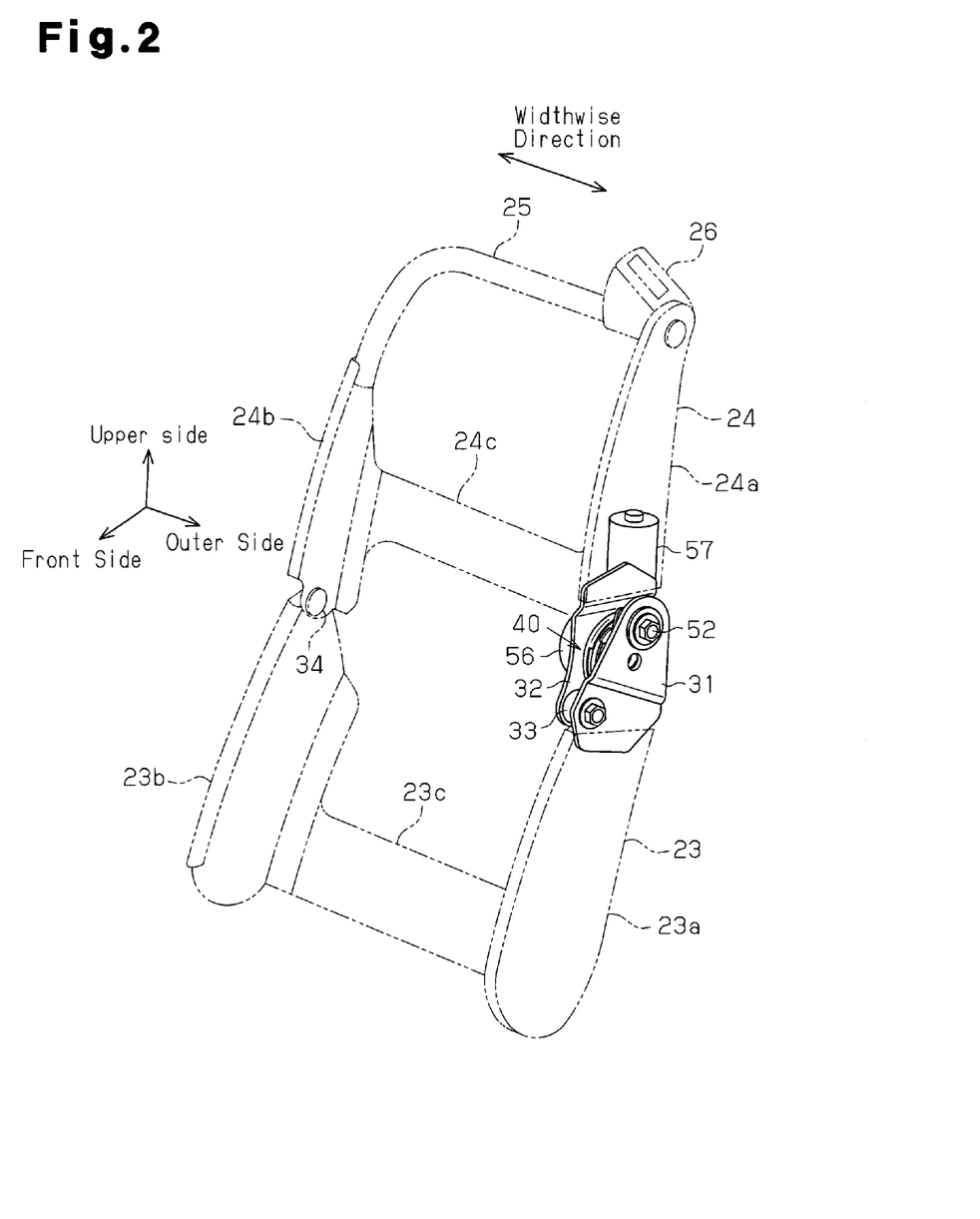
FIG. 2 is a perspective view of FIG. 1.

In detail, two seat cushion frames 5 are arranged at two opposite sides of the seat cushion 1 in the widthwise direction of the seat cushion 1 (direction perpendicular to the plane of FIG. 1). The seat cushion frames 5 form the framework of the seat cushion 1. The seat cushion frames 5 are formed from metal plates. Known reclining mechanisms 6 are arranged at the rear ends of the two seat cushion frames 5. As also shown in FIG. 2, a lower seat back frame 23 formed from metal plate, for example, forms a framework of the lower seat back 21. The lower seat back frame 23 includes two lower side frames 23a and 23b arranged at two opposite sides in the widthwise direction to serve as a second seat member and a lower frame. The lower seat back frame 23 also includes a connection frame 23c that connects the lower ends of the two lower side frames 23a and 23b to each other. The lower seat back frame 23 is coupled to the rear end of the seat cushion frame 5 at the lower ends of the lower side frames 23a and 23b by the reclining mechanisms 6.

As a result, the lower seat back frame 23 is tiltable relative to the seat cushion frame 5 in the front to rear direction so that the lower seat back 21 (seat back 2) is tiltable relative to the seat cushion 1 in the front to rear direction. The lower seat back 21 (seat back 2) may be held at any tilt angle relative to the seat cushion 1 in the front to rear direction within its movable range. A lower member 31, which is formed from, for example, a metal plate and serves as a second seat member and a lower frame, is welded and fixed to an upper end of the lower side frame 23a at one side (right side in FIG. 2) of the lower seat back frame 23 that is an outer side in the widthwise direction of the seat back 2.

An upper seat back frame 24 formed from metal plate, for example, forms a framework of the upper seat back 22. The upper seat back frame 24 includes two upper side frames 24a and 24b, which serve as a first seat member and as an upper frame arranged at two opposite sides in the widthwise direction. The upper seat back frame 24 also includes a connection frame 24c, which connects lower ends of the two upper side frames 24a and 24b. The upper side frames 24a and 24b are arranged at different heights. Upper ends of the upper side frames 24a and 24b are connected to each other by a substantially L-shaped connecting bar 25 formed from metal bar, for example. An upper member 32, which serves as a first seat member and as an upper frame and is formed from a metal plate, for example, is welded and fixed to the lower end of the upper side frame 24a at one side (right side in FIG. 2) of the upper seat back frame 24 that is an inner side in the widthwise direction of the seat back 2.

A substantially stepped cylindrical hinge shaft 33 extends through and supports, in a relatively pivotal manner, front portions of the two lower ends of the lower member 31 and the upper member 32. The hinge shaft 33 extends through the front portions of the lower ends of the lower member 31 and the upper member 32 in the widthwise direction. A pin-shaped hinge shaft 34 supports, in a relatively pivotal manner, an upper end of the lower side frame 23b on the other side (left side in FIG. 2) of the lower seat back frame 23 and a lower end of the upper side frame 24b on the other side of the upper seat back frame 24. The hinge shaft 34 extends through the upper end of the lower side frame 23b and the lower end of the upper side frame 24b in the widthwise direction. Needless to say, the hinge shafts 33 and 34 have aligned axes. Thus, the upper seat back frame 24 is tiltable relative to the lower seat back frame 23 in the front to rear direction so that the upper seat back 22 is tiltable relative to the lower seat back 21 in the front to rear direction.

A shoulder anchor portion 26 for a seat belt is arranged on an upper end of the upper side frame 24a at the side where the lower member 31 and the upper member 32 of the seat back 2 are arranged. That is, the vehicle seat apparatus of the present embodiment is for a seat belt-integrated seat incorporating a winding device (not shown) for the seat belt in the seat back 2. The side where the shoulder anchor portion 26 of the seat back 2 is arranged corresponds to the outer side of the vehicle in the widthwise direction of the vehicle.

Figure 3:
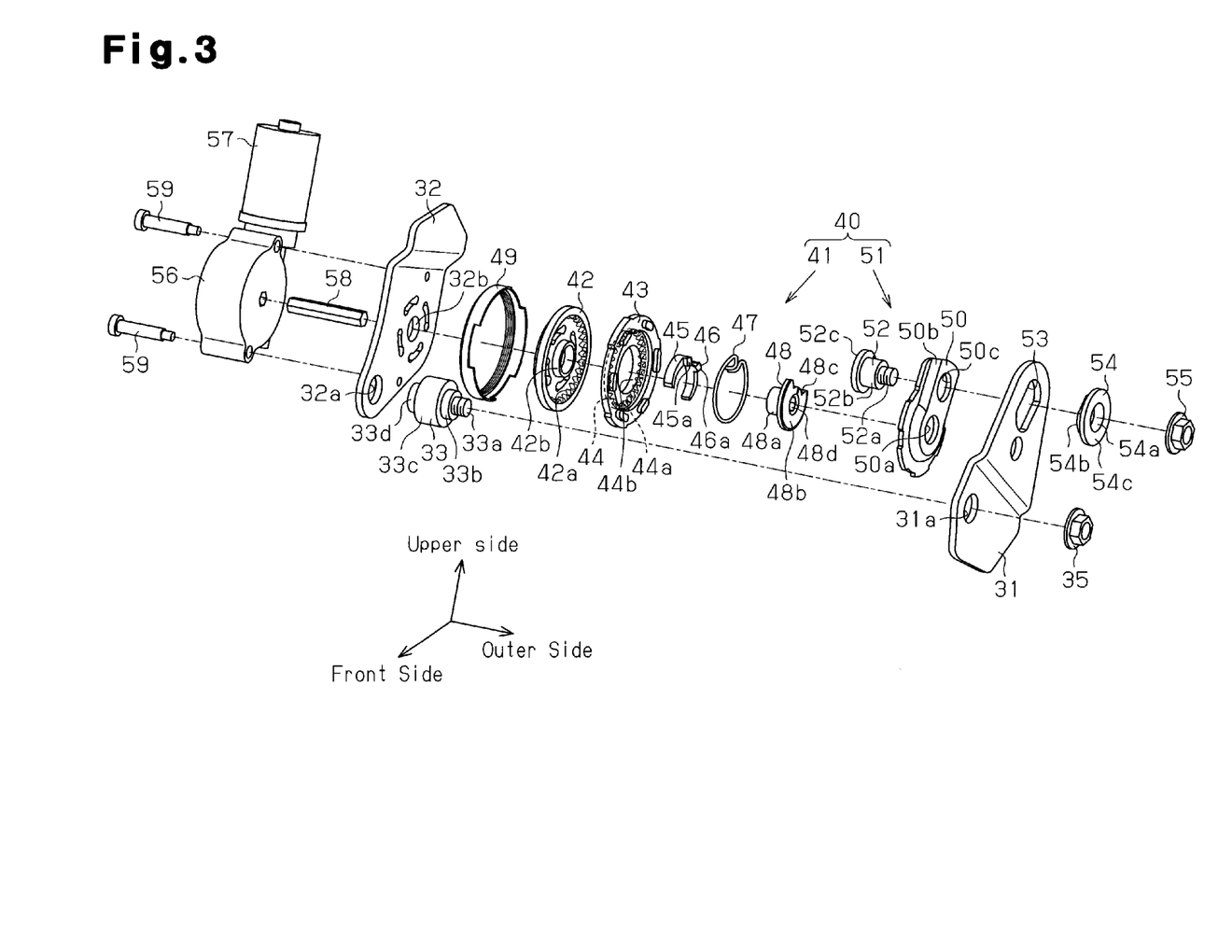
FIG. 3 is an exploded perspective view of FIG. 1.

A seat adjustment device 40 is arranged between the lower member 31 and the upper member 32 in a space formed in the widthwise direction. That is, as shown in FIG. 3, the hinge shaft 33 includes a threaded portion 33a, which is loosely inserted into a circular bearing hole 31a formed in the lower member 31, and a substantially cylindrical shaft portion 33b, which is supported by the bearing hole 31a. The shaft portion 33b has a large diameter than the threaded portion 33a. The hinge shaft 33 includes a substantially cylindrical intermediate shaft portion 33c, which has a further larger diameter than the shaft portion 33b, and a substantially cylindrical coupling portion 33d, which has a smaller diameter than the intermediate shaft portion 33c. The coupling portion 33d is inserted into and welded and fixed to a circular coupling hole 32a formed in the upper member 32 so that the coupling portion 33d rotates integrally with the hinge shaft 33. The shaft portion 33b, which is fixed to the upper member 32, is supported by the bearing hole 31a of the lower member 31, and a nut 35 is fastened to the threaded portion 33a, which projects out of the bearing hole 31a. This fastens the lower member 31 and the upper member 32 in a relatively pivotal manner. The intermediate shaft portion 33c of the hinge shaft 33 arranged between the lower member 31 and the upper member 32 ensures that space is provided in the widthwise direction.

The upper member 32 includes a circular shaft-insertion hole 32b formed in a substantially central portion of the upper member 32 upward and rearward from the coupling hole 32a. The axis of the shaft-insertion hole 32b is parallel to the axis of the upper member 32. A versatile rotation adjustment mechanism 41 formed by a hypocycloidal gear train is arranged around the shaft-insertion hole 32b at the side of the upper member 32 facing the lower member 31.

The rotation adjustment mechanism 41 includes a fixed portion 42, which is substantially cylindrical, has a closed end, and is welded and fixed to the upper member 32. The fixed portion 42 is concentric with the shaft-insertion hole 32b. The fixed portion 42 is formed from a metal plate through half blanking. The fixed portion 42 includes an inner circumference forming an internal gear 42a and a central section forming a cylindrical boss 42b. Further, the rotation adjustment mechanism 41 includes a pivot portion 43 formed from a metal plate through half blanking. The pivot portion 43 includes a ring 44 projecting toward the fixed portion 42. The ring 44 has an outer diameter that is smaller than an inner diameter of the fixed portion 42 (teeth tip inner diameter of internal gear 42a). The ring 44 includes an outer circumference forming an external gear 44a and a central section forming a cylindrical boss 44b. An inner diameter of the boss 44b is greater than an outer diameter of the boss 42b.

The internal gear 42a has a number of teeth that is greater by a predetermined number (e.g., one) than the external gear 44a. The teeth of the internal gear 42a are shaped so that the internal gear 42a engaged with the external gear 44a. When the internal gear 42a and the external gear 44a are engaged with each other, the axis of the internal gear 42a and the axis of the external gear 44a are eccentric.

The eccentric engagement of the internal gear 42a and the external gear 44a forms an annular space between the outer circumferential surface of the boss 42b and an inner circumferential surface of the boss 44b. Two symmetric wedge members 45 and 46 are arranged in the annular space that is divided into two at an angular position where the internal gear 42a and the external gear 44a are engaged with each other and an opposite angular position. The wedge members 45 and 46 are each substantially arch-shaped and include an inner wall surface having a larger inner diameter than the outer diameter of the boss 42b and an outer wall surface concentric to the boss 44b and having an outer diameter equal to the inner diameter of the boss 44b. The wedge members 45 and 46 have widths in the radial direction that increase toward a distal side in the circumferential direction, which is the side of the angular position where the internal gear 42a and the external gear 44a are engaged with each other. An ohm-shaped holding spring 47 forcibly widens the wedge members 45 and 46 so that the wedge members 45 and 46 are urged toward a side that increases an eccentric amount of the internal gear 42a and the external gear 44a. Consequently, under a situation in which the inner wall surfaces of the wedge members 45 and 46 are in linear contact with the outer circumferential surface of the boss 42b, the outer wall surfaces of the wedge members 45 and 46 are supported by the inner circumferential surface of the boss 44b thereby holding the engagement meshing position and the center position of the internal gear 42a and the external gear 44a. The wedge members 45 and 46 include projections 45a and 46a projecting toward the outer side of the bosses 42b and 44b.

A drive cam 48, which is arranged in central sections of the fixed portion 42 and the pivot portion 43, includes a substantially cylindrical shaft portion 48a, which is supported by an inner circumferential surface of the boss 42b, and a cam portion 48b, which outwardly extends from a distal end of the shaft portion 48a and projects out of the boss 42b. The cam portion 48b includes a notch 48c and is sector-shaped. Rotation of the drive cam 48 around the boss 42b pushes the projections 45a and 46a of the wedge members 45 and 46 with the notch 48c and thereby integrally rotates the projections 45a and 46a. The holding spring 47 pushed by the wedge members 45 and 46 is reduced in diameter against the urging force of the holding spring 47. This moves a contact position of the inner wall surfaces of the wedge members 45 and 46 and the outer circumferential surface of the boss 42b and changes the eccentric amount of the internal gear 42a and the external gear 44a. The movement of the two wedge members 45 and 46 revolves the pivot portion 43 while holding the engagement of the internal gear 42a and the external gear 44a, and the rotation of the drive cam 48 is decelerated as the number of revolutions of the pivot portion 43 when the pivot portion 43 revolves. That is, whenever the drive cam 48 rotates once, the pivot portion 43 is pivoted relative to the fixed portion 42 by an angle corresponding to the difference between the number of teeth of the internal gear 42a and the number of teeth of the external gear 44a. A polygonal fitting hole 48d is formed in the drive cam 48.

An annular pushing member 49 is fitted, welded, and fixed to a periphery of the fixed portion 42. The pushing member 49 holds the pivot portion 43 so as to permit the rotation described above.

An arm member 50, which is formed from a metal plate, is welded and fixed to a surface of the pivot portion 43 facing the lower member 31. The arm member 50 includes a circular shaft-insertion hole 50a, which is concentric with the external gear 44a and the like, and an arm portion 50b, which outwardly extends in the radial direction from the center of the shaft-insertion hole 50a (i.e., axis of pivot portion 43). A circular coupling hole 50c is formed in a distal end of the arm portion 50b. The axis of the coupling hole 50c is parallel to the axis of the hinge shaft 33 and the axis of the pivot portion 43.

A substantially stepped cylindrical guide pin 52 is fixed to the coupling hole 50c, and the guide pin 52 extends through the coupling hole 50c in the widthwise direction. That is, the guide pin 52 has a threaded portion 52a which is loosely inserted into the coupling hole 50c, a substantially cylindrical shaft portion 52b, which has a larger diameter than the threaded portion 52a and is inserted into, welded, and fixed to the coupling hole 50c, and a flange 52c, which has a larger diameter than the shaft portion 52b and abuts against the periphery of the coupling hole 50c on the side facing the pivot portion 43.

A substantially elongated guide hole 53, serving as a guide portion, is formed in an upper end of the lower member 31 extending substantially along an extending direction of the arm portion 50b. A bushing 54 is attached to the guide hole 53. The bushing 54 includes a circular bearing hole 54a, which has an inner diameter equal to an inner diameter of the coupling hole 50c (outer diameter of the shaft portion 52b) and which is concentric with the coupling hole 50c, a cylindrical slide portion 54b, which has a shape substantially conforming to the guide hole 53 and which is inserted into the guide hole 53, and a flange 54c, which has a larger diameter than the slide portion 54b and which abuts against the periphery of the guide hole 53 at the side of the lower member 31 opposite to the pivot portion 43. The slide portion 54b has a length in the longitudinal direction that is set to be shorter than the length of the guide hole 53 in the longitudinal direction. The length of the slide portion 54b in the direction of the short side is set to be equal to length of the guide hole 53 in the direction of the short side. This supports the bushing 54 so that the bushing 54 is movable in the longitudinal direction of the guide hole 53 but not movable in the direction of short side of the guide hole 53.

The guide pin 52 fixed to the coupling hole 50c of the arm member 50 fastens together the lower member 31 and the arm member 50 by supporting a distal end of the shaft portion 52b projecting from the coupling hole 50c with the bearing hole 54a of the bushing 54 attached to the guide hole 53 and a nut 55 fastened to the threaded portion 52a projecting from the bearing hole 54a.

A decelerating unit 56 is fastened to the upper member 32 by a shoulder bolt 59 at the side opposite to the fixed portion 42. The decelerating unit 56 is coupled to and driven by a rotation shaft of an electric motor 57. The decelerating unit 56 decelerates the rotation of the rotation shaft and outputs rotation from an output shaft (not shown). A polygonal shaft 58 is coupled to the output shaft so that the shaft 58 rotates integrally with the output shaft. The shaft 58 is loosely inserted into the shaft-insertion hole 32b and the boss 42b, and fitted into the fitting hole 48d of the drive cam 48.

Accordingly, when the shaft 58 is rotated and driven by the electric motor 57 through the decelerating unit 56, the shaft 58 and the drive cam 48 rotate integrally. The rotation of the drive cam 48 is decelerated in the rotation adjustment mechanism 41 and transmitted to the pivot portion 43 (and the arm member 50) as described above. Here, the guide pin 52 supported by the arm member 50 (arm portion 50b) slides in the longitudinal direction of the guide hole 53 through the bushing 54, and pushes the inner wall surface of the guide hole 53 in the direction of the short side. As a result, adjustment of the rotation angle between the fixed portion 42 and the pivot portion 43 in the rotation adjustment mechanism 41 adjusts a tilt angle in the front to rear direction of the lower member 31 and the upper member 32 about the hinge shaft 33. In other words, when the pivot portion 43 rotates relative to the fixed portion 42, the guide pin 52 moves in the guide hole 53 thereby absorbing changes in the eccentric amount of the axis of the pivot portion 43 relative to the axis of the hinge shaft 33 (i.e., change in the distance between the axis of the hinge shaft 33 and the axis of the pivot portion 43). That is, the guide pin 52, the guide hole 53, and the like form a coupling mechanism 51 that permits relative pivoting in the front to read direction of the lower member 31 and the upper member 32 (lower side frame 23a and upper side frame 24a), which move in cooperation with the rotation of the pivot portion 43 relative to the fixed portion 42 in order to absorb changes in the eccentric amount of the axis of the pivot portion 43 relative to the axis of the hinge shaft 33.

Figure 4A:
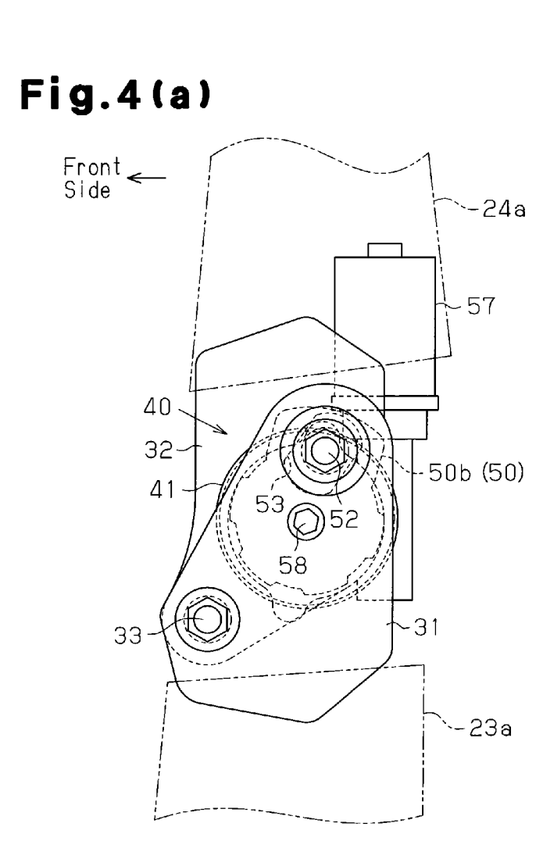
FIGS. 4(a) and 4(b) are side views showing an upper seat back of FIG. 1 at a rearward tilting position and a forward tilting position.
Figure 4B:
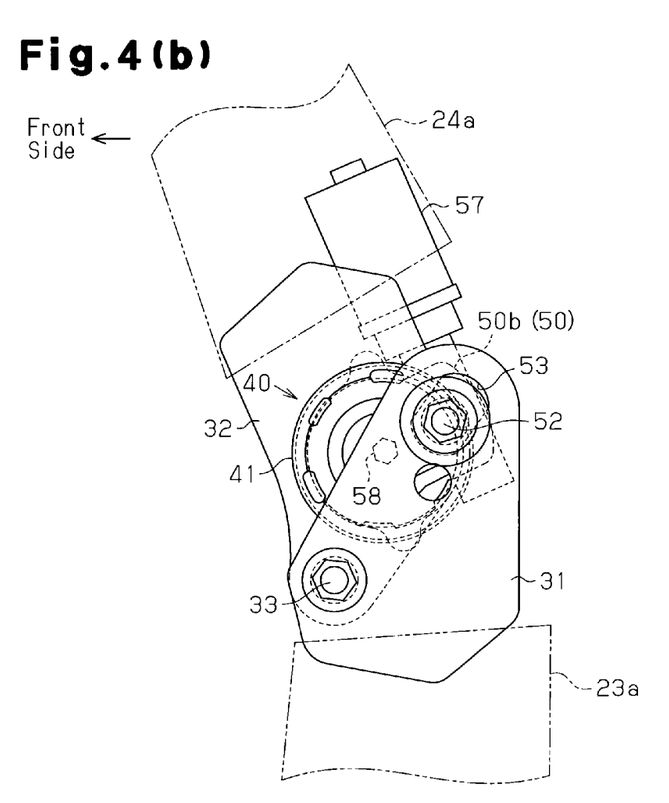

More specifically, as shown in FIG. 4(a), when the guide pin 52 is arranged at the upper side of the guide hole 53, the orientations of the lower member 31 (lower side frame 23a) and the upper member 32 (upper side frame 24a) are adjusted and held so that they are connected in a generally linear manner. As shown in FIG. 4(b), when the guide pin 52 is arranged at the lower side of the guide hole 53, the orientations of the lower member 31 (lower side frame 23a) and the upper member 32 (upper side frame 24a) are adjusted and held so that the upper member 32 is tilted forward relative to the lower member 31.

In this manner, as the pivot portion 43 (and the arm member 50) rotates relative to the fixed portion 42, the guide pin 52 moves in the guide hole 53, and the upper member 32 (upper side frame 24a) is tilted relative to the lower member 31 (lower side frame 23a) about the hinge shaft 33. More specifically, when clockwise rotation of the arm member 50 moves the guide pin 52 downward in the guide hole 53, the upper member 32 (upper side frame 24a) is tilted forward relative to the lower member 31 (lower side frame 23a). In contrast, when counterclockwise rotation of the arm member 50 moves the guide pin 52 upward in the guide hole 53, the upper member 32 (upper side frame 24a) is tilted rearward relative to the lower member 31 (lower side frame 23a). When the pivot portion 43 stops rotating relative to the fixed portion 42 and the guide pin 52 stops moving in the guide hole 53, the tilt angle of the upper member 32 (upper side frame 24a) relative to the lower member 31 (lower side frame 23a) about the hinge shaft 33 is held in accordance with the stopped position of the guide pin 52.

Next, the relationship of the moment applied to the rotation adjustment mechanism 41 and the arrangement of the lower member 31, the upper member 32 (upper side frame 24a), the hinge shaft 33, the rotation adjustment mechanism 41, the arm member 50, the guide pin 52, and the like will be described. For the sake of convenience, a concise description of the relationship will be given using two-dimensional space defined on a single plane (i.e., plane of paper) perpendicular to the axis of the hinge shaft 33 or the like. It is only necessary to take into consideration the predominant moment applied to the rotation adjustment mechanism 41.

Figure 5:
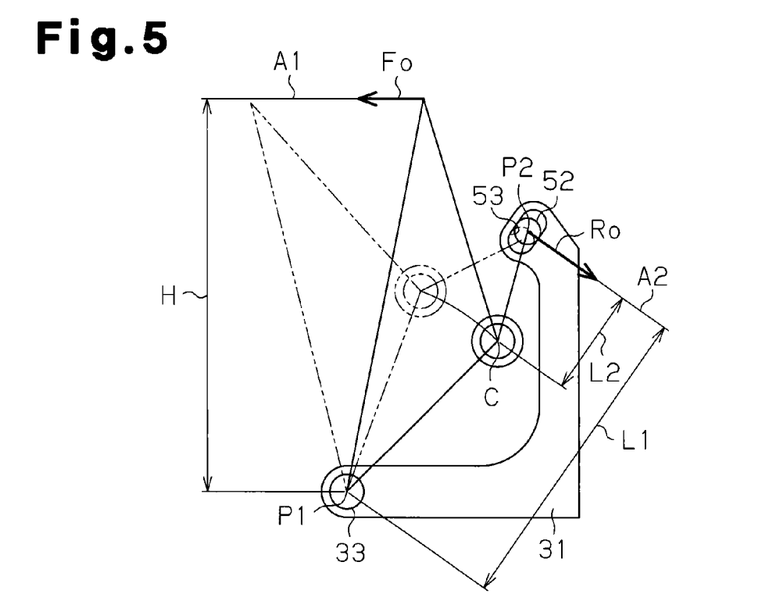
FIG. 5 is a schematic diagram illustrating moment and the like in the apparatus of FIG. 1.

As schematically shown in FIG. 5, a coupling point of the lower member 31 and the upper member 32 by the hinge shaft 33 is defined as a first coupling point P1, and a coupling point of the guide pin 52 (guide hole 53) and the arm portion 50b is defined as a second coupling point P2. The axis of the pivot portion 43 is defined as a center point C.

It is assumed here that a load Fo is applied in the generally front to rear direction to the upper end of the upper side frame 24a, and the distance from the first coupling point P1 to an acting line A1 in a direction perpendicular to the acting line A1 of the load Fo (substantially equal to height direction) is defined as distance H. The magnitude of moment in this case, i.e., magnitude M1 of moment at the first coupling point P1 is expressed by the following equation:

$$M1 = Fo * H$$

Here, when a load Ro is applied from the lower member 31 to the second coupling point P2 as a reaction force, an acting line A2 of the load Ro conforms to a straight line extending through the second coupling point P2 that is perpendicular to a straight line connecting the first and second coupling points P1 and P2. When the distance from the first coupling point P1 to the second coupling point P2 in a direction perpendicular to the acting line A2 is defined as distance L1, the load Ro is expressed by the following equation based on the equilibrium of the moment:

$$Ro = M1/L1 = Fo * H/L1$$

When the distance from the second coupling point P2 to the center point C in a direction perpendicular to the acting line A2 is defined as distance L2, the magnitude Mo of the moment applied to the center point C is expressed by the following equation:

$$Mo=Ro*L2=Fo*H*L2/L1$$

In the present embodiment, in a tilting range about the hinge shaft 33 of the upper side frame 24a relative to the lower side frame 23a, the distance L2 from the second coupling point P2 to the center point C is set to be shorter than the distance L1 from the first coupling point P1 to the second coupling point P2 (L1>L2). In other words, the tilting range about the hinge shaft 33 of the upper side frame 24a relative to the lower side frame 23a is limited so as to satisfy the above-described setting (L1>L2). Accordingly, the value of a ratio of the distance L2 to the distance L1 (=L2/L1) is less than "1", the magnitude Mo of the moment applied to the center point C (i.e., rotation adjustment mechanism 41) is less than the magnitude M1 of the moment applied to the upper end of the upper side frame 24a, and the moment strength required for the rotation adjustment mechanism 41 is reduced. Reduction in the moment strength required for the rotation adjustment mechanism 41 becomes more effective as the distance L1 is set to be longer and the distance L2 is set to be shorter. In the present embodiment, the arm portion 50b is extended in a direction extending radially outward from the axis of the pivot portion 43, i.e., in a direction extending away from the hinge shaft 33 (first coupling point P1), and the second coupling point P2 is arranged at the arm portion 50b. This ensures that the distance L1 is relatively long. The pivot portion 43 (rotation adjustment mechanism 41) is arranged using the space between the hinge shaft 33 (first coupling point P1) and the second coupling point P2. This easily realizes the setting described above in which the distance L2 is set to be smaller than the distance L1.

The operation of the present embodiment will now be described.

For example, it is assumed that an appropriate operation switch is operated by a vehicle occupant and the electric motor 57 is driven. As a result, when the shaft 58 is rotated and driven by the electric motor 57 through the decelerating unit 56, the drive cam 48 rotates integrally with the shaft 58. When the rotation of the drive cam 48 is decelerated in the rotation adjustment mechanism 41 and the rotation is transmitted to the pivot portion 43 (and the arm member 50), the guide pin 52 supported by the arm member 50 (arm portion 50b) slides in the longitudinal direction of the guide hole 53 through the bushing 54, and pushes the inner wall surface of the guide hole 53 in the direction of the short side. This pivots the upper member 32 about the hinge shaft 33 relative to the lower member 31, and tilts the upper side frame 24a in the front to rear direction relative to the lower side frame 23a.

The tilting of the upper side frame 24a is transmitted to the opposite upper side frame 24b by the connecting bar 25. This tilts the upper side frame 24b about the hinge shaft 34 in the front to rear direction relative to the lower side frame 23b. As a result, the entire upper seat back frame 24 is tilted in the front to rear direction about the hinge shafts 33 and 34 relative to the lower seat back frame 23, and the upper seat back 22 is tilted in the front to rear direction relative to the lower seat back 21.

It is further assumed that an extreme load (Fo) is applied from the seat belt, which supports a vehicle occupant, to the upper end of the lower side frame 23a through the shoulder anchor portion 26 due to a vehicle collision or the like, for example. In this case, the magnitude (Mo) of the moment at the axis of the pivot portion 43 (rotation adjustment mechanism 41) is less than the magnitude (M1) of moment at the upper end of the lower side frame 23a as described above.

As described above in detail, the present embodiment has the following advantages.

(1) In the present embodiment, when an extreme load (Fo) is applied to the upper end of the upper side frame 24a, for example, an extreme moment (M1) is applied to the first coupling point P1. As a result, when a load (Ro) is received from the lower member 31 (lower side frame 23a) at the second coupling point P2, moment is applied to the axis of the pivot portion 43 (rotation adjustment mechanism 41) based on the load. The moment at this time is equal to a value obtained by multiplying the moment in the first coupling point P1 by a value of a ratio of the distance L2 to the distance L1 (L2/L1). In this case, by setting the distance L2 to be shorter than the distance L1, the magnitude of the moment in the axis of the pivot portion 43 (rotation adjustment mechanism 41) is reduced accordingly. This allows for reduction in the strength (moment strength) required for the rotation adjustment mechanism 41, and the rotation adjustment mechanism 41 does not have to be increase in size and weight.

In particular, a conventional rotation adjustment mechanism including a hypocycloidal gear train employed in an electric reclining device may be used as the rotation adjustment mechanism 41 thereby improving versatility. This allows for reduction in the time required for development and reduction in costs.

(2) In the present embodiment, the guide pin 52 is moved in the guide hole 53 as the pivot portion 43 rotates relative to the fixed portion 42 to absorb changes in the eccentric amount of the axis of the pivot portion 43 relative to the axis of the hinge shaft 33. In this case, movement of the guide pin 52 is firmly restricted by the guide hole 53. This allows for further accurate pivoting of the upper member 32 about the hinge shaft 33 relative to the lower member 31, that is, further accurate tilting of the upper side frame 24a relative to the lower side frame 23a in the front to rear direction.

(3) In the present embodiment, the seat adjustment device 40 adjusts the tilt angle in the front to rear direction of the lower seat back frame 23 (lower side frame 23a) and the upper seat back frame 24 (upper side frame 24a). This allows for further fine adjustment of the orientation of the seat back 2 thereby improving the seating comfort.

(4) In the present embodiment, the axis of the hinge shaft 33 is further frontward from the seat back 2 than the axis of the pivot portion 43, that is, toward the vehicle occupant. Thus, the tilting movement of the upper seat back 22 (upper seat back frame 24) becomes closer to the movement of the vehicle occupant who bends forward. This reduces the deviation between the upper seat back 22 and the back. Therefore, the upper seat back 22 suppresses pushing of the back of the vehicle occupant with the upper portion of the seat back, and reduces a sense of being confined in a confined or narrow place.

(5) In the present embodiment, the seat adjustment device 40 is arranged on only one side in the widthwise direction (corresponding to the outer side in the widthwise direction of the vehicle) in conformance with load characteristics in which a larger load is applied to the side where the shoulder anchor portion 26 is arranged in the widthwise direction of the seat back 2 during a vehicle collision. This reduces the number of parts while ensuring the necessary strength. That is, even if the vehicle seat apparatus is for a seat belt-integrated seat designed to withstand a high load, the seat adjustment device 40 may be arranged on one side. At the opposite side of the seat adjustment device 40 (corresponding to the inner side in the widthwise direction of the vehicle), the lower side frame 23b and the upper side frame 24b may be coupled together by the simple structure of only the hinge shaft 34.

(6) In the present embodiment, it is only necessary to arrange the single decelerating unit 56 and the electric motor 57 for driving the seat adjustment device 40 on one side. Thus, the number of parts and costs may further be reduced.

Second Embodiment

A second embodiment of the present invention will now be described with reference to FIG. 6. In the second embodiment, only the structure for absorbing changes in the eccentric amount of the axis of the pivot portion 43 relative to the axis of the hinge shaft 33 is modified from the first embodiment. Therefore, similar components will not be described in detail.

Figure 6:
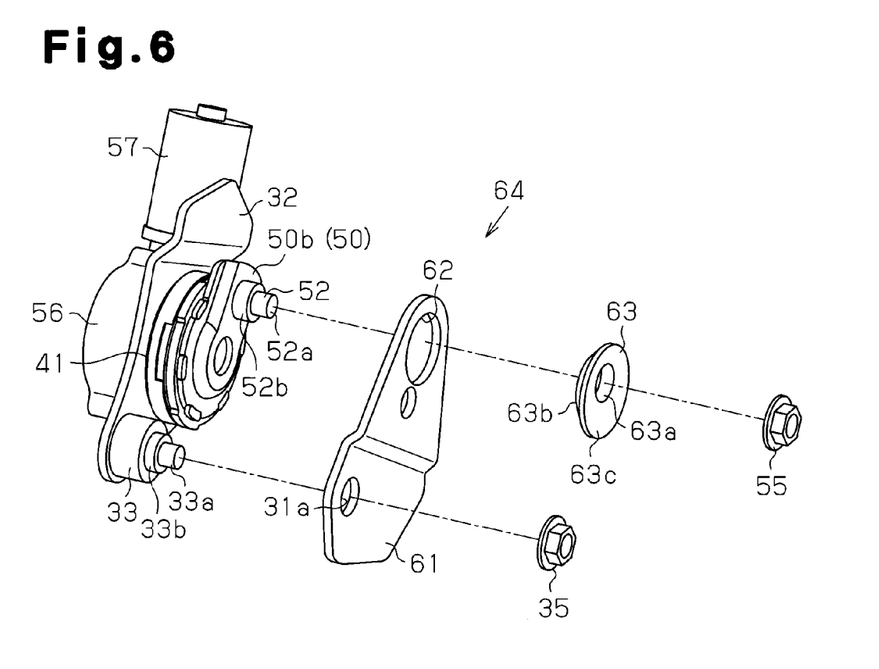
FIG. 6 is an exploded perspective view of a vehicle seat apparatus according to a second embodiment of the present invention.

As shown in FIG. 6, a lower member 61, which serves as a second seat member and a lower frame formed from metal plate, for example, is welded and fixed to an upper end of an outer surface in the widthwise direction of the lower side frame 23a. A circular bearing hole 62, which serves as a bearing portion, is formed in an upper end of the lower member 61. The bearing hole 62 opens toward the guide pin 52 and has an inner diameter that is sufficiently larger than an outer diameter of the guide pin 52 (shaft portion 52b). An eccentric bushing 63, which serves as a shaft member, is attached to the bearing hole 62. The eccentric bushing 63 has a circular bearing hole 63a, which has an inner diameter equal to the outer diameter of the shaft portion 52b and which is concentric with the shaft portion 52b. The eccentric bushing 63 also has a substantially cylindrical shaft portion 63b, which is inserted into and supported by the bearing hole 62, and a flange 63c, which has a larger diameter than the shaft portion 63b and which abuts against the periphery of the bearing hole 62 on the surface opposite to the arm member 50. The axis of the bearing hole 63a (guide pin 52) is set to be parallel to the axis of the shaft portion 63b (bearing hole 62).

The distal end of the shaft portion 52b of the guide pin 52 is supported by the bearing hole 63a of the eccentric bushing 63 attached to the bearing hole 62, and the nut 55 is fastened to the threaded portion 52a projecting from the bearing hole 63a. This fastens together the lower member 61 and the arm member 50.

Here, when the rotation adjustment mechanism 41 (pivot portion 43) is rotated and driven by the electric motor 57 through the decelerating unit 56 in the above-described manner, the guide pin 52 supported by the arm member 50 (arm portion 50b) pushes an inner wall surface of the bearing hole 63a so that the eccentric bushing 63 pivots about the bearing hole 62 while pivoting about the bearing hole 63a. As a result, adjustment of the tilt angle between the fixed portion 42 and the pivot portion 43 in the rotation adjustment mechanism 41 adjusts the tilt angle in the front to rear direction of the lower member 61 and the upper member 32 about the hinge shaft 33. In other words, when the pivot portion 43 rotates relative to the fixed portion 42, the eccentric bushing 63, which supports the guide pin 52, pivots about the bearing hole 62 and absorbs changes in the eccentric amount of the axis of the pivot portion 43 relative to the axis of the hinge shaft 33. That is, the guide pin 52, the bearing hole 62, the eccentric bushing 63 and the like form a coupling mechanism 64 that permits relative pivoting in the front to rear direction of the lower member 61 and the upper member 32 (the lower side frame 23a and the upper side frame 24a), which move in cooperation with the rotation of the pivot portion 43 relative to the fixed portion 42 when changes in the eccentric amount of the axis of the pivot portion 43 relative to the axis of the hinge shaft 33 is absorbed.

In the same manner as the first embodiment, rotation of the pivot portion 43 (and the arm member 50) relative to the fixed portion 42 pivots the eccentric bushing 63, which supports the guide pin 52, about the bearing hole 62. This tilts the upper member 32 (upper side frame 24a) about the hinge shaft 33 relative to the lower member 61 (lower side frame 23a). When the pivot portion 43 stops rotating relative to the fixed portion 42, the eccentric bushing 63 stops pivoting in the bearing hole 62 of the eccentric bushing 63, which supports the guide pin 52. The tilt angle of the upper member 32 (upper side frame 24a) relative to the lower member 61 (lower side frame 23a) about the hinge shaft 33 is held in accordance with the stopped position of the eccentric bushing 63 (and the guide pin 52).

Next, the relationship between the moment applied to the rotation adjustment mechanism 41 and the arrangement of the lower member 61, the upper member 32 (upper side frame 24a), the hinge shaft 33, the rotation adjustment mechanism 41, the arm member 50, and the like will be described. A two-dimensional space defined on a single plane (i.e., plane of paper) perpendicular to the axis of the hinge shaft 33 will be used like in the first embodiment.

Figure 7:
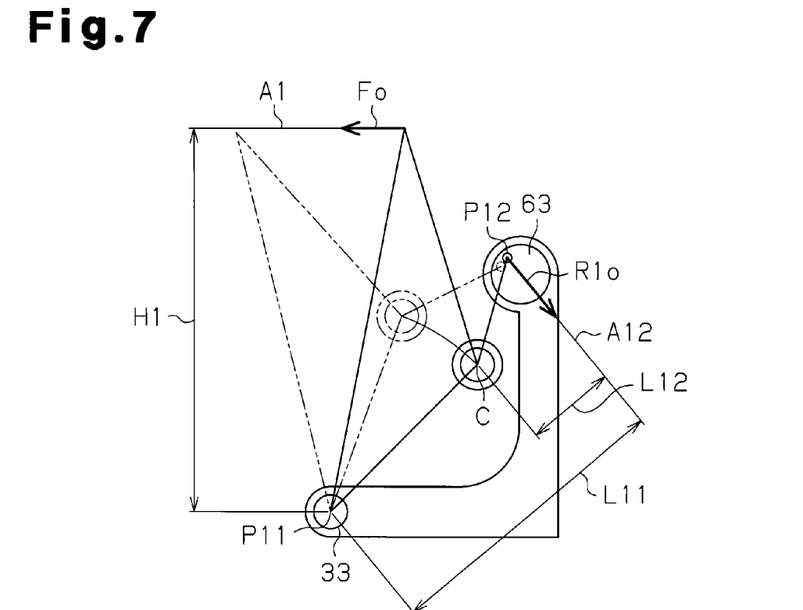
FIG. 7 is a schematic diagram illustrating moment and the like in the apparatus of FIG. 5.

As schematically shown in FIG. 7, a coupling point of the lower member 61 and the upper member 32 by the hinge shaft 33 is defined as a first coupling point P11, and a coupling point of the guide pin 52 (bearing hole 62, eccentric bushing 63) and the arm portion 50b (arm member 50) is defined as a second coupling point P12.

It is assumed here that the load Fo is applied to the upper end of the upper side frame 24a, and the distance from the first coupling point P11 to the acting line A1 in a direction perpendicular to the acting line A1 of the load Fo is defined as a distance H1. The magnitude of the moment here, that is, the magnitude M11 of the moment at the first coupling point P11 is expressed by the following expression:

$$M11 = Fo * H1$$

Here, when the load R1o is applied to the second coupling point P12 from the lower member 31 as a reaction force, an acting line A12 of the load R1o conforms to a straight line connecting a center point of the eccentric bushing 63 (bearing hole 62) and the second coupling point P12. If the distance from the first coupling point P11 to the second coupling point P12 in a direction perpendicular to the acting line A12 is defined as a distance L11, the load R1o is expressed by the following equation based on equilibrium of the moment:

$$R1o = M11/L11 = Fo*H1/L11$$

If the distance from the second coupling point P12 to the center point C in a direction perpendicular to the acting line A12 is defined as a distance L12, the magnitude M1o of moment applied to the center point C is expressed by the following equation:

$$M1o = R1o*L12 = Fo*H1*L12/L11$$

In the present embodiment, in the tilting range about the hinge shaft 33 of the upper side frame 24a relative to the lower side frame 23a, the distance L12 from the second coupling point P12 to the center point C is set to be shorter than the distance L11 from the first coupling point P11 to the second coupling point P12 (L11>L12). Therefore, the value of a ratio of the distance L12 to the distance L11 (=L12/L11) is less than "1", the magnitude M1o of the moment applied to the center point C (i.e., rotation adjustment mechanism 41) is less than the magnitude M11 of the moment applied to the upper end of the upper side frame 24a, and the moment strength required for the rotation adjustment mechanism 41 is reduced. Reduction in the moment strength required for the rotation adjustment mechanism 41 becomes more effective as the distance L11 is set to be longer and as the distance L12 is set to be shorter. In the present embodiment, the arm portion 50b is extended in a direction extending radially outward from the axis of the pivot portion 43, that is, in a direction extending away from the hinge shaft 33 (first coupling point P11), and the second coupling point P12 is arranged at the arm portion 50b. This ensures that the distance L11 is relatively long. The pivot portion 43 (rotation adjustment mechanism 41) is arranged using the space between the hinge shaft 33 (first coupling point P11) and the second coupling point P12. This allows for the setting described above in which the distance L12 is set to be smaller than the distance L11 to be easily realized.

As described above in detail, the present embodiment obtains the advantages described below in addition to advantages (1) and (3) to (6) of the first embodiment.

(7) In the present embodiment, the pivot portion 43 is rotated relative to the fixed portion 42, and the eccentric bushing 63, which supports the guide pin 52, is pivoted about the bearing hole 62. This allows for absorption of changes in the eccentric amount of the axis of the pivot portion 43 relative to the axis of the hinge shaft 33.

Third Embodiment

A third embodiment of the present invention will now be described with reference to FIG. 8. In the third embodiment, only the structure for absorbing changes in the eccentric amount of the axis of the pivot portion 43 relative to the axis of the hinge shaft 33 is modified from the first embodiment. Therefore, similar components will not be described in detail.

Figure 8:
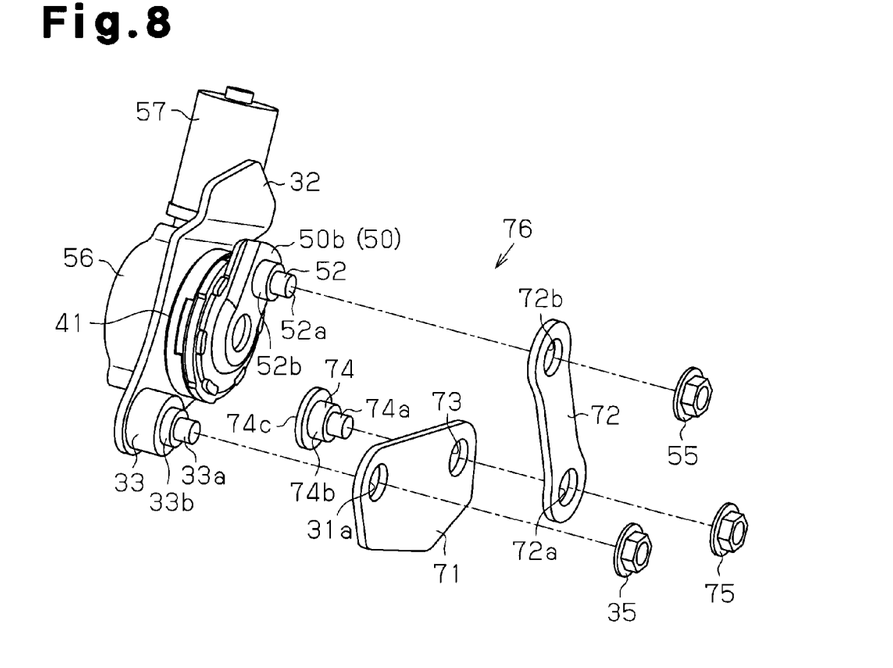
FIG. 8 is an exploded perspective view of a vehicle seat apparatus according to a third embodiment of the present invention.

As shown in FIG. 8, a lower member 71, which serves as a second seat member and a lower frame formed from metal plate, for example, is welded and fixed to the upper end of the outer surface in the widthwise direction of the lower side frame 23a. The lower member 71 is pivotally coupled to an elongated rod member 72 formed from metal plate, for example. That is, a circular coupling hole 73 is formed in the lower member 71 behind the bearing hole 31a. A substantially stepped cylindrical support pin 74 is fixed to the coupling hole 73. The support pin 74 extends through the coupling hole 73 in the widthwise direction. The support pin 74 has a threaded portion 74a which is loosely inserted into the coupling hole 73, and a substantially cylindrical shaft portion 74b, which is inserted into and welded and fixed to the coupling hole 73. The shaft portion 74b has a larger diameter than the threaded portion 74a. The support pin 74 also includes a flange 74c, which has a larger diameter than the shaft portion 74b and which abuts against the periphery of the coupling hole 73 at the side facing the rotation adjustment mechanism 41. A circular bearing hole 72a, which supports a distal end of the shaft portion 74b projecting from the coupling hole 73, is formed in a lower end (first end) of the rod member 72. The shaft portion 74b of the support pin 74 fixed to the lower member 71 is supported by the bearing hole 72a of the rod member 72, and a nut 75 is fastened to the threaded portion 74a projecting from the bearing hole 72a. This fastens together the lower member 71 and the rod member 72 in a relatively pivotal manner.

The upper end (second end) of the rod member 72 is pivotally coupled to the arm member 50 by the guide pin 52. That is, a circular bearing hole 72b is formed in the upper end of the rod member 72. The bearing hole 72b opens toward the guide pin 52. The distal end of the shaft portion 52b of the guide pin 52 is supported by the bearing hole 72b, and the nut 55 is fastened to the threaded portion 52a projecting from the bearing hole 72b. This fastens together the rod member 72 and the arm member 50 in a relatively pivotal manner. The axis of the bearing hole 72b (guide pin 52) and the axis of the bearing hole 72a (support pin 74) are set to be parallel to the axis of the hinge shaft 33.

Here, when the rotation adjustment mechanism 41 (pivot portion 43) is rotated and driven by the electric motor 57 through the decelerating unit 56 in the above-described manner, the guide pin 52 supported by the arm member 50 (arm portion 50b) pushes an inner wall surface of the bearing hole 72b so that the rod member 72 pivots about the bearing hole 72a (support pin 74) while pivoting about the bearing hole 72b. As a result, the adjustment of the rotation angle between the fixed portion 42 and the pivot portion 43 in the rotation adjustment mechanism 41 adjusts the tilt angle of the front to rear direction between the lower member 71 and the upper member 32 about the hinge shaft 33. In other words, when the pivot portion 43 rotates relative to the fixed portion 42, the rod member 72, which supports the guide pin 52, pivots about the bearing hole 72a, and changes are absorbed in the eccentric amount of the axis of the pivot portion 43 relative to the axis of the hinge shaft 33. That is, the rod member 72 and the like form a coupling mechanism 76 that permits relative pivoting in the front to rear direction of the lower member 71 and the upper member 32 (the lower side frame 23a and the upper side frame 24a), which move in cooperation with the rotation of the pivot portion 43 relative to the fixed portion 42 when changes are absorbed in the eccentric amount of the axis of the pivot portion 43 relative to the axis of the hinge shaft 33.

In the same manner as the first embodiment, rotation of the pivot portion 43 (and the arm member 50) relative to the fixed portion 42 swings the rod member 72, which supports the guide pin 52, about the bearing hole 72a. This tilts the upper member 32 (upper side frame 24a) about the hinge shaft 33 relative to the lower member 61 (lower side frame 23a). When the pivot portion 43 stops rotating relative to the fixed portion 42, the rod member 72, which supports the guide pin 52, stops swinging about the bearing hole 72a. This holds the tilt angle of the upper member 32 (upper side frame 24a) relative to the lower member 71 (lower side frame 23a) about the hinge shaft 33 in accordance with the stopped position of the rod member 72 (and the guide pin 52).

Next, the relationship between the moment applied to the rotation adjustment mechanism 41 and the arrangement of the lower member 71, the upper member 32 (upper side frame 24a), the hinge shaft 33, the rotation adjustment mechanism 41, the arm member 50, and the like will be described. A two-dimensional space defined on a single plane (i.e., plane of paper) perpendicular to the axis of the hinge shaft 33 or the like is used in the same manner as the first embodiment.

Figure 9:
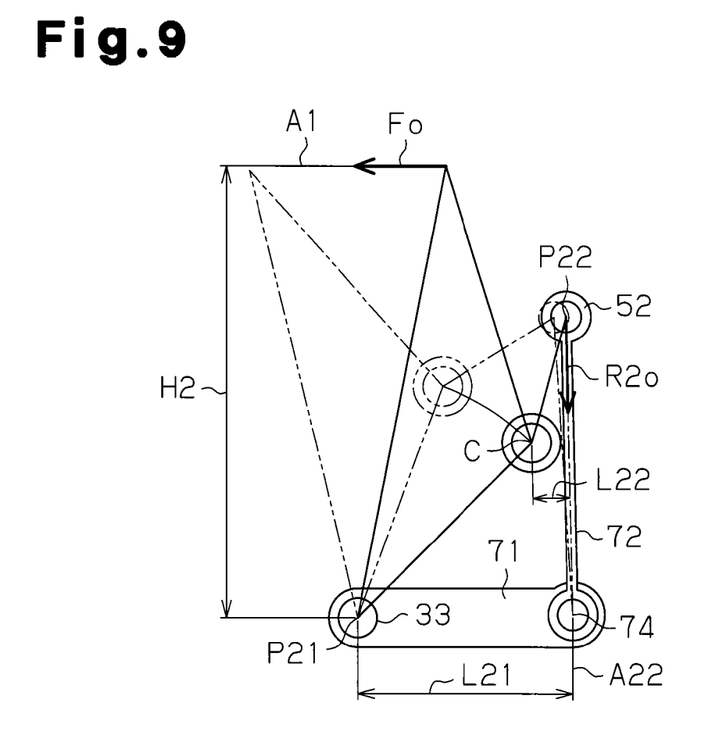
FIG. 9 is a schematic diagram illustrating moment and the like in the apparatus of FIG. 8.

As schematically shown in FIG. 9, a coupling point of the lower member 71 and the upper member 32 connected by the hinge shaft 33 is defined as a first coupling point P21, and a coupling point of the rod member 72 and the arm portion 50b (arm member 50) is defined as a second coupling point P22.

It is assumed that load Fo is applied to the upper end of the upper side frame 24a, and the distance from the first coupling point P21 to the acting line A1 in a direction perpendicular to the acting line A1 of the load Fo is defined as the distance H2. The magnitude of the moment here, that is, the magnitude M21 of the moment in the first coupling point P21 is expressed by the following expression:

$$M21 = Fo * H2$$

At this time, when the load R2o is applied to the second coupling point P22 from the lower member 31 as a reaction force, an acting line A22 of the load R2o conforms to a straight line connecting a center point of the support pin 74 (bearing hole 72a) and the second coupling point P22. When the distance from the first coupling point P21 to the second coupling point P22 in a direction perpendicular to the acting line A22 is defined as a distance L21, the load R2o is expressed by the following equation based on the equilibrium of the moment:

$$R2o=M21/L21=Fo*H2/L21$$

When the distance from the second coupling point P22 to the center point C in a direction perpendicular to the acting line A22 is defined as a distance L22, the magnitude M2o of the moment applied to the center point C is expressed by the following equation:

$$M2o=R2o*L22=Fo*H2*L22/L21$$

In the present embodiment, in the tilting range about the hinge shaft 33 of the upper side frame 24a relative to the lower side frame 23a, the distance L22 from the second coupling point P22 to the center point C is set to be shorter than the distance L21 from the first coupling point P21 to the second coupling point P22 (L21>L22). Therefore, the value of a ratio of the distance L22 to the distance L21 (=L22/L21) is less than "1", the magnitude M2o of the moment applied to the center point C (i.e., rotation adjustment mechanism 41) is less than the magnitude M21 of the moment applied to the upper end of the upper side frame 24a, and the moment strength required for the rotation adjustment mechanism 41 is reduced. Reduction in the moment strength required for the rotation adjustment mechanism 41 becomes more effective as the distance L21 is set to be longer and as the distance L22 is set to be shorter. In the present embodiment, the arm portion 50b is extended in a direction moving radially outward from the axis of the pivot portion 43, that is, in a direction extending away from the hinge shaft 33 (first coupling point P21), and the second coupling point P22 is arranged at the arm portion 50b. This ensures that the distance L21 is relatively long. The pivot portion 43 (rotation adjustment mechanism 41) is arranged using the space between the hinge shaft 33 (first coupling point P21) and the second coupling point P22. This easily realizes the setting described above in which the distance L22 is set to be smaller than the distance L21.

As described above in detail, the present embodiment has the following advantage in addition to advantages (1) and (3) to (6) of the first embodiment.

(8) In the present embodiment, rotation of the pivot portion 43 relative to the fixed portion 42 swings the rod member 72. This allows for changes to be absorbed in the eccentric amount of the axis of the pivot portion 43 relative to the axis of the hinge shaft 33. Further, changes in the eccentric amount may be absorbed with an extremely simple structure formed by the rod member 72.

The embodiments may be varied as follows.

In the first embodiment, the guide hole 53 may be a non-through groove.

In the first embodiment, the positional relationship of the arm portion 50b (arm member 50) and the lower member 31 and the positional relationship of the guide pin 52 and the guide hole 53 may be reversed.

In the second embodiment, the bearing hole 62 or the bearing hole 63a may be a non-through recess.

In the second embodiment, the positional relationship of the arm portion 50b (arm member 50) and the lower member 61 and the positional relationship of the guide pin 52 and the bearing hole 62 (eccentric bushing 63) may be reversed.

In each of the above embodiments, the seat adjustment device 40 may be arranged upside down relative to the lower members 31, 61, 71 and the upper member 32. In this case, the lower members 31, 61, 71 and the lower side frame 23a form the first seat member, and the upper member 32 and the upper side frame 24a form the second seat member.

In each of the above embodiments, a decelerating mechanism using a planet gear mechanism or a worm wheel gear may be employed as the rotation adjustment mechanism 41.

In each of the embodiments, a lock mechanism often used in a manual reclining mechanism may be employed as the rotation adjustment mechanism 41. That is, the lock mechanism includes a first plate provided with internal teeth and a second plate to which a plurality of poles are radially movably attached, and the internal teeth of the first plate and external teeth of the poles are meshed with and disengaged from each other by rotating a cam that is arranged around a rotation shaft in order to restrict or permit pivoting of the first plate relative to the second plate.

In each of the above embodiments, the rotation adjustment mechanism 41 may be arranged on both sides of the seat in the widthwise direction.

In each of the above embodiments, the electric motor 57 or the like may be omitted, and the shaft 58 (pivot portion 43 and the like) may be manually rotated and driven by an operation handle, which is coupled to and rotated integrally with the shaft 58.

In each of the above embodiments, the arm portion 50b (arm member 50) may be formed integrally with the pivot portion 43.

In each of the embodiments, the lower member 31 and the lower side frame 23a may integrally be formed together. Similarly, the upper member 32 and the upper side frame 24a may integrally be formed together.

In each of the above embodiments, the fixed portion 42 may be formed integrally with the first seat member (upper member 32 and the like).

Although the seat adjustment device 40 for tilting the upper seat back 22 of the vehicle seat apparatus relative to the lower seat back 21 has been described in each of the above embodiments, the present invention is not limited to the seat adjustment device 40. The invention of the present application is applicable to, for example, the reclining mechanism 6, a slide mechanism located in front of, behind, below, or above the seat cushion 1, a length adjustment mechanism of the seat cushion 1, an ottoman mechanism, and the like. The invention of the present application is not limited to adjustment mechanisms for a vehicle seat apparatus and the present invention is applicable to, for example, a tilt adjustment mechanism and a lock mechanism of a steering apparatus and the like.

The invention claimed is:

1. A seat adjustment device for adjusting a pivot angle between a first seat member and a second seat member coupled by a hinge shaft in a relatively pivotal manner, the seat adjustment device comprising:

a rotation adjustment mechanism including a fixed portion, which is fixed to the first seat member, and a pivot portion, which has an axis parallel to an axis of the hinge shaft and which is pivotally coupled to the fixed portion, wherein the rotation adjustment mechanism adjusts a rotation angle between the fixed portion and the pivot portion;

an arm portion arranged on the pivot portion, wherein the arm portion outwardly extends in a radial direction from the axis of the pivot portion; and a coupling mechanism arranged between the second seat member and the arm portion, wherein the coupling mechanism moves in cooperation with rotation of the pivot portion relative to the fixed portion and relatively pivots the first seat member and the second seat member to absorb a change in an eccentric amount of the axis of the pivot portion relative to the axis of the hinge shaft, wherein the hinge shaft couples the first seat member and the second seat member at a first coupling point, and the arm portion and the coupling mechanism are coupled to each other at a second coupling point, when a first load is applied to a distal end of one of the first seat member and the second seat member, a moment acts on the first coupling point, and a second load is applied to the second coupling point from the other one of the first seat member and the second seat member based on the moment, and a position of an axis of each of the first coupling point, the second coupling point, and the pivot portion is set so that a distance from the second coupling point to the axis of the pivot portion is shorter than a distance from the first coupling point to the second coupling point, each distance being in a direction perpendicular to an acting line of the second load applied to the second coupling point.

2. The seat adjustment device according to claim 1, wherein the coupling mechanism includes
  a guide pin projecting from one of the arm portion and the second seat member, and
  a guide portion, which has the form of an elongated hole, formed in the other one of the arm portion and the second seat member, wherein the guide pin is inserted into the guide portion; and
rotation of the pivot portion relative to the fixed portion moves the guide pin in the guide portion and thereby absorbs the change in the eccentric amount of the axis of the pivot portion relative to the axis of the hinge shaft.

3. The seat adjustment device according to claim 1, wherein the coupling mechanism includes
  a guide pin projecting from one of the arm portion and the second seat member,
  a bearing portion formed on the other one of the arm portion and the second seat member, and
  a shaft member supported by the bearing portion, wherein the shaft member includes a bearing hole that supports the guide pin, and an axis of the bearing hole is separated from an axis of the bearing portion; and
rotation of the pivot portion relative to the fixed portion pivots the shaft member in the bearing portion and absorbs the change in the eccentric amount of the axis of the pivot portion relative to the axis of the hinge shaft.

4. The seat adjustment device according to claim 1, wherein the coupling mechanism includes a rod member having a first end, coupled to the second seat member so that the first end is pivotal about an axis parallel to the axis of the hinge shaft and the axis of the pivot portion, and a second end, pivotally coupled to the arm portion, and rotation of the pivot portion relative to the fixed portion swings the rod member and absorbs the change in the eccentric amount of the axis of the pivot portion relative to the axis of the hinge shaft.

5. A vehicle seat apparatus comprising:

a seat cushion; and a seat back including the seat adjustment device according to claim 1, wherein the seat back includes
  a lower frame including a lower end supported to be tiltable relative to a rear end of a seat cushion frame arranged in the seat cushion, wherein the lower frame forms one of the first seat member and the second seat member, and
  an upper frame coupled to the lower frame, wherein the upper frame forms the other one of the first seat member and the second seat member.

6. The vehicle seat apparatus according to claim 5, wherein the axis of the hinge shaft is arranged further frontward from the seat back than the axis of the pivot portion.

7. The vehicle seat apparatus according to claim 5, wherein the upper frame and the lower frame are arranged on each of two sides of the seat back in a widthwise direction of the seat back, a shoulder anchor portion for a seat belt is arranged on an upper end of the upper frame located on one of the two sides in the widthwise direction, and the seat adjustment device is arranged on only the same side in the widthwise direction as the shoulder anchor portion.

* * * * *